United States Patent
Suzuki et al.

(10) Patent No.: US 11,073,187 B2
(45) Date of Patent: Jul. 27, 2021

(54) BRAKE PAD AND UNDER-LAYER MATERIAL COMPOSITION

(71) Applicants: ADVICS North America, Inc., Lebanon, OH (US); ADVICS CO., LTD., Kariya (JP)

(72) Inventors: Shusuke Suzuki, Kariya (JP); Katsuya Okayama, Kariya (JP); Masato Nishioka, Lebanon, OH (US)

(73) Assignee: ADVICS CO., LTD., Kariya (JP)

( * ) Notice: Subject to any disclaimer, the term of this patent is extended or adjusted under 35 U.S.C. 154(b) by 306 days.

(21) Appl. No.: 16/369,518

(22) Filed: Mar. 29, 2019

(65) Prior Publication Data

US 2020/0309223 A1    Oct. 1, 2020

(51) Int. Cl.
*F16D 69/02* (2006.01)

(52) U.S. Cl.
CPC ......... *F16D 69/028* (2013.01); *F16D 69/026* (2013.01); *F16D 2200/006* (2013.01); *F16D 2200/0026* (2013.01)

(58) Field of Classification Search
CPC ...... F16D 69/02; F16D 69/023; F16D 69/026; F16D 69/028; F16D 2200/006; F16D 2200/0026; F16F 65/126

USPC ...................................................... 188/251 A
See application file for complete search history.

(56) References Cited

U.S. PATENT DOCUMENTS

| | | | | |
|---|---|---|---|---|
| 5,515,950 A | * | 5/1996 | Kwolek | F16D 65/0006 188/250 B |
| 2007/0068750 A1 | * | 3/2007 | Hara | F16D 69/0408 188/251 A |
| 2007/0117881 A1 | | 5/2007 | Watanabe et al. | |
| 2015/0380277 A1 | * | 12/2015 | Morita | H01L 24/83 438/118 |

FOREIGN PATENT DOCUMENTS

JP    2007-154154 A    6/2007

* cited by examiner

*Primary Examiner* — Robert A. Siconolfi
*Assistant Examiner* — San M Aung
(74) *Attorney, Agent, or Firm* — Buchanan Ingersoll & Rooney PC

(57) ABSTRACT

A brake pad according to an embodiment includes a friction material containing copper at 0.5 wt % or less, a back plate, and an under-layer material laminated between the friction material and the back plate and having an average loss modulus of 500 MPa or more at −50° C. to 0° C. in a bending mode.

18 Claims, 3 Drawing Sheets

FIG. 3

| | | FIRST EXAMPLE | SECOND EXAMPLE | FIRST COMPARATIVE EXAMPLE | SECOND COMPARATIVE EXAMPLE | THIRD COMPARATIVE EXAMPLE | FOURTH COMPARATIVE EXAMPLE |
|---|---|---|---|---|---|---|---|
| COMPOSITION (Vol%) | ARAMID FIBER | 3 | 6 | 15 | 15 | 6 | 8 |
| | RUBBER | 32 | 21 | 6 | 6 | 16 | 27 |
| | IRON FIBER + MINERAL FIBER | 29 | 33 | 30 | 33 | 33 | 33 |
| | OTHER (THERMOSETTING RESIN, FRICTION MODIFIER) | 36 | 40 | 49 | 46 | 45 | 32 |
| | TOTAL | 100 | 100 | 100 | 100 | 100 | 100 |
| LOSS MODULUS LM [MPa] | | 737 | 513 | 340 | 316 | 311 | — |
| COMPRESSIBILITY (UNDER-LAYER MATERIAL) | | 66 | 66 | 59 | 74 | 71 | — |
| COMPRESSIBILITY [μm] (FRICTION MATERIAL + UNDER-LAYER MATERIAL) | | 90 | 90 | 89 | 89 | 88 | — |
| MOLDABILITY | | ○ | △ | ○ | ○ | ○ | × |
| NOISE GENERATION RATIO | | ◎ | ○ | △ | △ | △ | — |
| COMPREHENSIVE EVALUATION | | ◎ | ○ | × | × | × | × |

◎ : EXCELLENT
○ : GOOD
△ : ALLOWED
× : NO GOOD
— : UNRATED

BRAKE PAD AND UNDER-LAYER MATERIAL COMPOSITION

FIELD OF THE INVENTION

The present invention generally relates to a brake pad and an under-layer material composition.

BACKGROUND DISCUSSION

Recent technical innovations have enabled improvements in suppression of noise from a vehicle engine, a vehicle body, and the like. Another source of undesirable vehicle noise is brake noise associated with operation of vehicle brakes. This brake noise is relatively frequently recognized by a driver and potentially poses an even more serious problem than some other forms of vehicle noise.

In particular, since a problem of brake noise is due at least in part to a complicated correlation between brake components, the problem is approached as a problem in the entire brake system and tends to be dealt with in terms of individual components.

In addition, since a noise is a self-excited vibration phenomenon, noise generation mechanism has been studied from various viewpoints such as occurrence of vibration, resonance/coupling and damping, and countermeasures against noise have been proposed.

More specifically, examples of known countermeasures against brake pad noise include a method of moderating coupling force by increasing compressibility, a method using brake pad shims having high damping, and a method of adding rubber to a friction material and an under-layer.

Japanese Patent Application Publication No. 2007-154154 discloses another way of addressing brake noise using a non-asbestos friction material without significantly impairing performance of the friction material itself in terms of friction and wear performance.

SUMMARY

However, these known proposals can cause an increase in compressibility in a brake pad assembly, producing a degradation of driver's brake feeling, deterioration in fuel consumption caused by an increase in drag torque, and the like, and so a new problem may be posed.

The disclosed under-layer material composition used in a brake pad, and the disclosed brake pad comprised of such under-layer material, is well-suited to suppressing degradation of brake feeling and deterioration in fuel consumption caused by an increase in drag torque, while at the same time suppressing noise.

As a result of devoted research for solving the problem, it has been found that orientation of materials in the under-layer material causes anisotropy in compressibility and dynamic elasticity, and the possibility of suppressing an increase in compressibility and being capable of improving a damping capacity of a dynamic elastic modulus at which noise reduction effect can be expected has been discovered. For the damping capacity, more specifically, a loss modulus LM in a bending mode is represented, and it has been found out that the value of LM is increased to improve damping of bending vibration of the brake pad, so that a noise reduction effect can be achieved.

The brake pad according to an embodiment disclosed by way of example includes a friction material containing copper at 0.5 wt % or less in the light of recent environmental responsiveness, a back plate, and the above-mentioned under-layer material laminated between the friction material and the back plate and having an average loss modulus of 500 MPa or more at −50° C. to 0° C. in a bending mode.

In the above configuration, the under-layer material may contain a thermosetting resin, a friction modifier, rubber, and aramid fiber, wherein the amount of rubber is preferably 20 vol % to 40 vol %, and the amount of aramid fiber is preferably 3 vol % to 6 vol %.

In the above configuration, the under-layer material contains iron fiber and mineral fiber, and the amount of iron fiber and mineral fiber is preferably 25 vol % to 50 vol %.

In the configuration, high damping and proper compressibility can be held, and the moldability of the under-layer material can also be secured.

BRIEF DESCRIPTION OF THE DRAWINGS

FIG. 3 is an explanatory diagram of an example, a comparative example, and performance assessment.

DETAILED DESCRIPTION

Set forth below with reference to the accompanying drawings is a detailed description of an under-layer material used in a brake pad, and a brake pad including such an under-layer material, representing examples of the inventive under-layer material used in a brake pad, and a brake pad disclosed here.

The configuration and construction of the under-layer material and brake pad according to an embodiment will be described below, and an operation and result (advantage) obtained by the construction and configuration are examples. The present invention can also be achieved by a construction and configuration different from that described below FIGS. 1A and 1B are explanatory diagrams of a brake pad according to an embodiment.

Figure 1A:
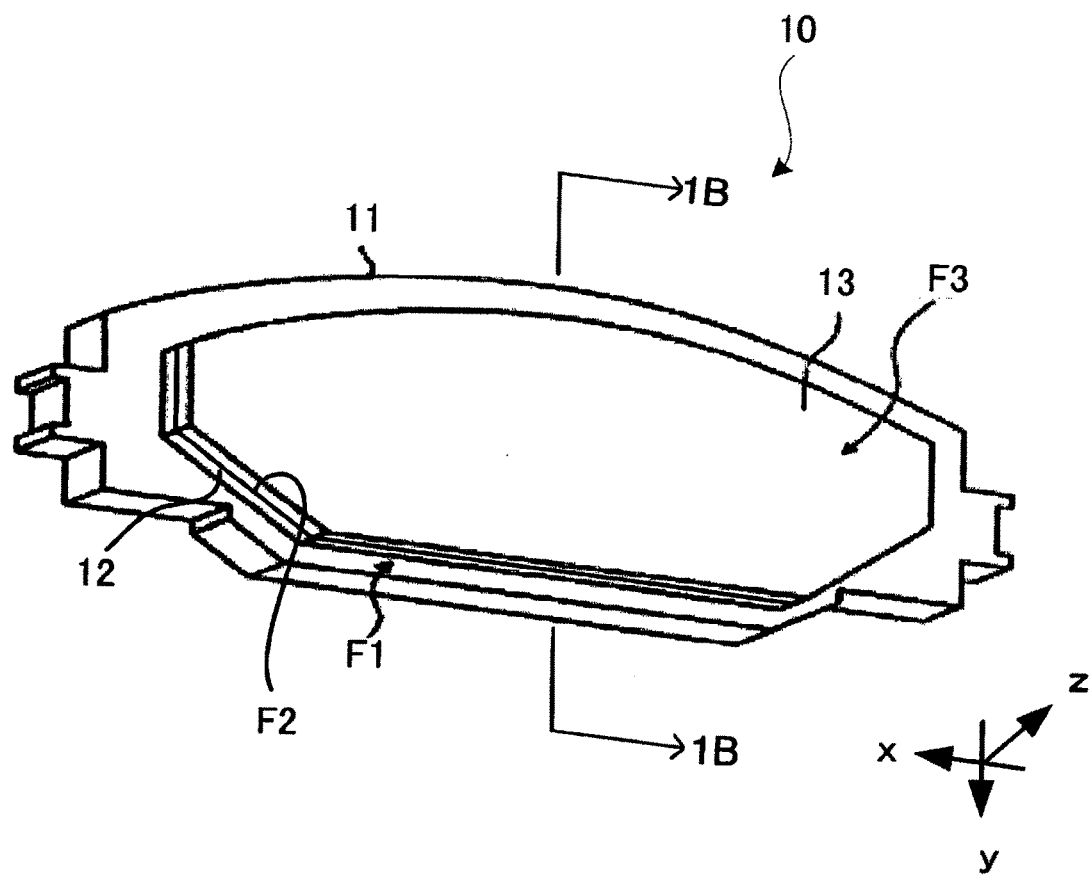
FIGS. 1A and 1B are explanatory diagrams of a brake pad according to an embodiment.
Figure 1B:
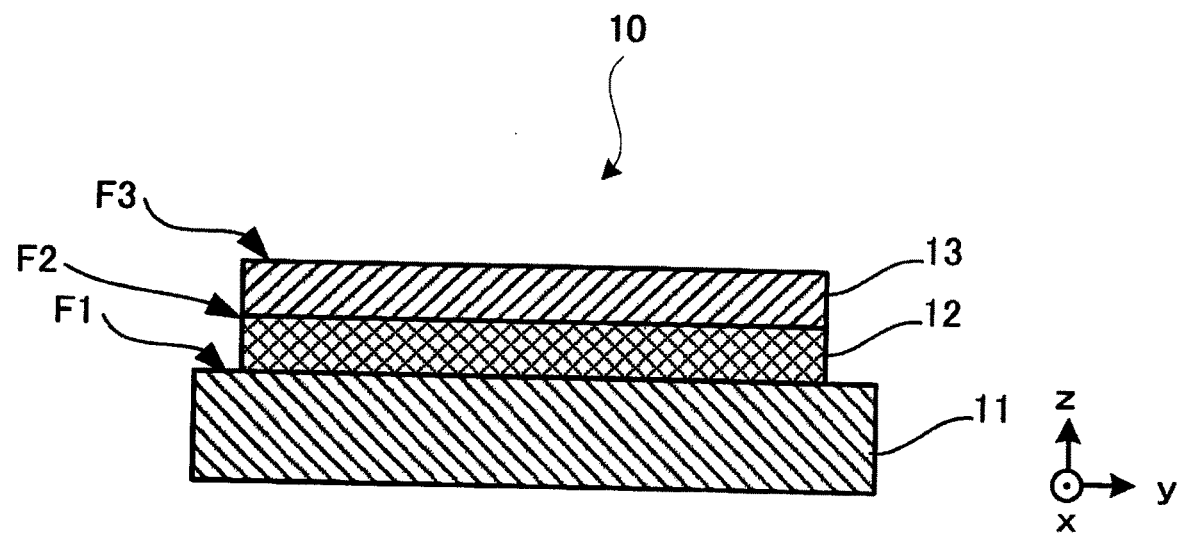

FIG. 1A an external perspective view of the brake pad according to one embodiment, and FIG. 1B is a cross-sectional view taken along the section line 1B-1B in FIG. 1A.

As shown in FIG. 1, the brake pad 10 includes a back plate 11 made of iron and having a first surface F1, an under-layer material 12 having a second surface F2 facing towards and in contact with the first surface F1, and a friction material (lining) 13 having a third surface F3 facing towards and in contact with the second surface F2. The third surface F3 is thus positioned in opposition to the second surface F2 while also being substantially parallel to the second surface F2. Similarly, the second surface F2 is positioned in opposition to the first surface F1 while also being substantially parallel to the first surface F1.

In this case, the under-layer material 12 is laminated between or positioned between the back plate 11 and the friction material 13. The under-layer material 12 has a thickness of approximately 1.0 mm-2.5 mm, more preferably 1.2 mm-2.2 mm, and still more preferably 1.5 mm-2.0 mm.

Since the under-layer material 12 functions mainly to complement the compressibility and durability rather than frictional performance, the under-layer material 12 has the capability of being designed more freely than the friction material 13. That is, there may be more freedom in configuring and composing the under-layer material 12, as compared to the friction material 13, because the under-layer material 12 need not necessarily exhibit certain frictional characteristics or attain particular performance characteristics.

Thus, in the embodiment, the under-layer material 12 is configured and composed to improve noise performance.

The configuration and composition of the under-layer material 12 according to an embodiment disclosed here by way of example which can improve noise performance is explained below.

First, in the under-layer material, since a material is oriented in a planar direction (XY plane in FIG. 1) and has a characteristic feature which appears as dynamic viscoelasticity, it was discovered that the dynamic viscoelasticity contributes to damping when the brake pad 11 is bent and vibrated, and thus a dynamic viscoelasticity in a bending vibration mode was measured.

As a test piece, a sample of under-layer material was made having a length in the X direction, a length (height or dimension) in the Y direction, and a thickness in the Z direction shown in FIG. 1 in consideration of a vibration direction obtained when the brake pad 10 is bent and vibrated, and a measurement was performed under the following measurement condition using a DMA 242 E Artemis model dynamic mechanical analyzer available from NETZSCH.

[Dynamic Viscoelasticity Measurement Condition in Bending Vibration Mode]

Measurement method: 3-point bending mode
Test piece size: 50 mm×8 mm×2 mm (50 mm length or width in the X direction, 8 mm length in the Y direction, and 2 mm thickness in the Z direction)
Temperature: −100° C. to 300° C. (temperature increase rate 2° C./min)
Frequency: 1 Hz, 5 Hz, 10 Hz In consideration of a relationship between dynamic viscoelasticity and noise performance in the bending vibration mode of the under-layer material 12, both a temperature characteristic and a frequency characteristic should be considered.

For this reason, after the above-described measurement was performed at frequencies of 1 Hz, 5 Hz, and 10 Hz in a temperature region or range of −100° C. to 300° C., temperature-frequency conversion was performed using Williams-Landel-Ferry Equation to form a master curve representing frequency characteristics, so that a temperature range corresponding to about 1 kHz to 20 kHz serving as a frequency band in which noise was actually generated was calculated. In the obtained range, an average value of the loss modulus LM at −50° C. to 0° C. was used as a parameter of damping.

A noise test will be described below.

In this case, samples whose frequency coefficients were made equal to each other by using the same friction material and each of which had a compressibility of 88 μm to 90 μm were used as a brake pad to check an influence of the loss modulus LM of the under-layer material to noise performance.

As brake specifications used in the noise test, a combination between a 2-piston floating-type brake caliper and a cast-iron rotor was used, and a clip-type brake pad shim and a chamfered portion were provided on the brake pad.

With the above specifications, cold noise evaluation was performed.

Figure 2:
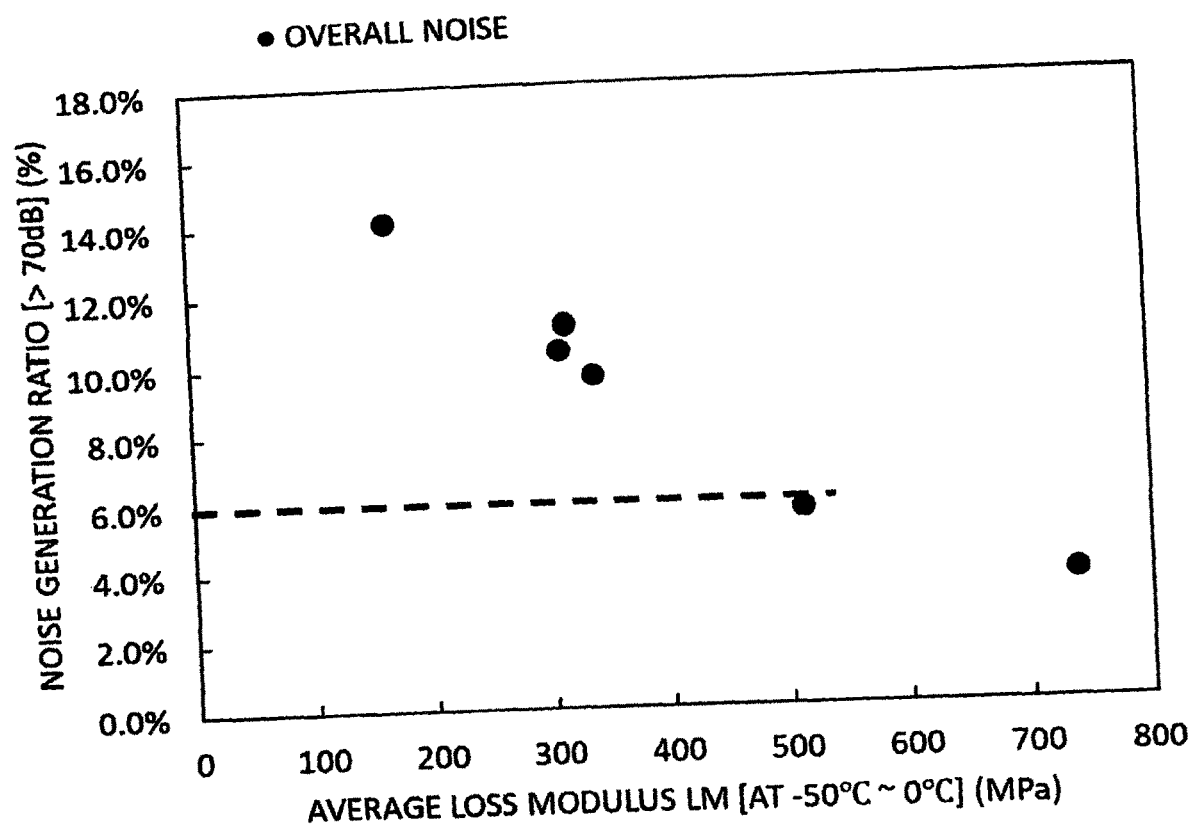
FIG. 2 is an explanatory correlation diagram between a noise generation ratio and a loss modulus LM.

FIG. 2 is an explanatory correlation diagram between a noise generation ratio and the average loss modulus LM.

As shown in FIG. 2, when the average loss modulus LM of the under-layer material 12 in the bending vibration mode is 500 MPa or more, a noise generation ratio of 6.0% or less can be achieved which, from a practical standpoint, is sufficient and desirable. The inventors here discovered that composing the under-layer material from a composition that achieves an average loss modulus of 500 MPa or more at −50° C. to 0° C. in a bending mode produces desirable results in terms of noise reduction. The under-layer material may be comprised of rubber and aramid fiber, and may also be comprised of iron fiber, mineral fiber, thermosetting resin and a friction modifier.

A concrete example will be described below.

FIG. 3 is an explanatory diagram or table setting forth performance assessments of several examples falling within the scope of the inventive under-layer material disclosed here and several comparative examples.

[1] EXAMPLES

[1. 1] First Example

The composition of an under-layer material according to the first example will be described below.

As composition elements of this example, the elements forming the composition may be roughly classified as aramid fiber, rubber, iron fiber (steel fiber) and mineral fiber, and other materials. Examples of the other materials include a thermosetting resin, a friction modifier, and the like.

The aramid fibers are heat-resistant and relatively strong synthetic fibers. The mineral fiber may be inorganic fiber, and examples include various types of mineral wool such as Rockwool and slag wool. Friction modifiers and thermosetting resins which may be used in the under-layer material are known to persons in the art.

The composition of an under-layer material in the first example will be described below in detail.

In the first example, the composition includes 3 vol % of aramid fiber and 32 vol % of rubber, and these two materials were mixed.

A total of 29 vol % of iron fiber and mineral fiber was mixed with the aramid fiber/rubber mixture.

Furthermore, 36 vol % of another material was mixed with the aramid fiber, rubber and iron fiber/mineral fiber mixture to obtain a total of 100 vol %.

The mixture or composition of the aramid fiber, rubber, iron fiber, mineral fiber and other material may be formed or molded using known processes/methods similar to those used by individuals in this art to produce known under-layer materials for brake pads. That is, as is known, heat and pressure may be applied to the under-layer composition positioned in a mold together with a back plate and the composition for the friction material to produce the brake pad shown in FIG. 1 comprised of the back plate 11, the under-layer material 12 and the friction material (lining) 13.

[1. 2] Second Example

The composition of the under-layer material in a second example will be described below in detail.

In the second example, the composition includes 6 vol % of aramid fiber and 21 vol % of rubber, and these two materials were mixed.

A total of 33 vol % of iron fiber and mineral fiber was mixed with the aramid fiber/rubber mixture.

Furthermore, 40 vol % of another material was mixed with the aramid fiber, rubber and iron fiber/mineral fiber mixture to obtain a total of 100 vol %.

[2] COMPARATIVE EXAMPLES

[2. 1] First Comparative Example

A composition of the under-layer material in a first comparative example will be described below in detail.

In the first comparative example, the composition includes 15 vol % of aramid fiber and 6 vol % of rubber, and these two materials were mixed.

A total of 30 vol % of iron fiber and mineral fiber was mixed with the aramid fiber/rubber mixture.

Furthermore, 49 vol % of another material was mixed with the aramid fiber, rubber and iron fiber/mineral fiber mixture to obtain a total of 100 vol %.

[2. 2] Second Comparative Example

A composition of the under-layer material in a second comparative example will be described below in detail.

In the second comparative example, the composition includes 15 vol % of aramid fiber and 6 vol % of rubber, and these two materials were mixed.

A total of 33 vol % of iron fiber and mineral fiber was mixed with the aramid fiber/rubber mixture.

Furthermore, 46 vol % of another material was mixed with the aramid fiber, rubber and iron fiber/mineral fiber mixture to obtain a total of 100 vol %.

[2. 3] Third Comparative Example

A composition of the under-layer material in a third comparative example will be described below in detail.

In the third comparative example, the composition includes 6 vol % of aramid fiber and 16 vol % of rubber, and these two materials were mixed.

A total of 33 vol % of iron fiber and mineral fiber was mixed with the aramid fiber/rubber mixture.

Furthermore, 45 vol % of another material was mixed with the aramid fiber, rubber and iron fiber/mineral fiber mixture to obtain a total of 100 vol %.

[2. 4] Fourth Comparative Example

A composition of the under-layer material in a fourth comparative example will be described below in detail.

In the fourth comparative example, the composition includes 8 vol % of aramid fiber and 27 vol % of rubber that were mixed together.

A total of 33 vol % of iron fiber and mineral fiber was mixed with the aramid fiber/rubber mixture.

Furthermore, 32 vol % of another material was mixed with the aramid fiber, rubber and iron fiber/mineral fiber mixture to obtain a total of 100 vol %.

[3] CHARACTERISTIC AND PERFORMANCE EVALUATION

Each of the examples and comparative examples described above were evaluated in terms of loss modulus LM in a bending vibration mode, compressibility of the under-layer material itself, compressibility of the friction material and the under-layer material as a whole (together), moldability, and noise generation ratio. With respect to the measurement of the compressibility of the under-layer material and the friction material, the under-layer material was evaluated while positioned between the back plate 11 (shown in FIG. 1) and the friction material 13 (shown in FIG. 1) as in normal usage. With respect to the measurement of the compressibility of the under-layer material itself, the under-layer material was evaluated while applied to the back plate 11 (shown in FIG. 1) as in normal usage, except that the thickness of the under-layer material equaled the thickness of the under-layer material 12 and the thickness of the friction material 13 combined. Thus, consider as an example that the back plate 11 shown in FIG. 1 has a thickness t1, the under-layer material 12 shown in FIG. 1 has a thickness t2, and the friction material 13 in FIG. 1 has a thickness t3. The results shown in FIG. 3 of the compressibility of the under-layer material and the friction material involve measuring the compressibility of the under-layer material having a thickness t2 positioned between a back plate 11 having a thickness t1 and a friction material 13 having a thickness t3. On the other hand, the results shown in FIG. 3 of the compressibility of the under-layer material itself involve measuring the compressibility of the under-layer material having a thickness t2+t3 applied to a back plate 11 having a thickness t1.

[3.1] Loss Modulus LM

The loss modulus LM in the bending vibration mode was measured by the above described method.

The loss modulus LM in the bending vibration mode exceeded 500 MPa in the first example (737 MPa) and the second example (513 MPa), but was significantly lower than 500 MPa in the first, second and third comparative examples (311 MPa to 340 MPa).

The loss modulus LM in the bending vibration mode of the fourth comparative example could not be evaluated because the moldability of the mixture was poor.

[3. 2] Compressibility of the Under-Layer Material

The compressibility of the under-layer materials according to the two examples and the comparative examples were approximately equal to each other (59 μm to 74 μm) except for the fourth comparative example which could not be evaluated because the moldability was poor. That is, attempts to mold the composition of the fourth comparative example produced a product with cracks that could not be used in a brake pad.

[3. 3] Overall Compressibility (Friction Material and Under-Layer Material)

The overall compressibility of the friction material and under-layer material together according to the two examples and the four comparative examples were approximately equal to each other (88 μm to 90 μm) except for the fourth comparative example which once again could not be evaluated because the moldability was poor. That is, molding the composition of the fourth comparative example produced a product with cracks and so the product could not be used in a brake pad.

[3. 4] Moldability

The moldability of each of the examples and each of the comparative example was evaluated and assigned one of three grades, namely that the molding was easy (good [○]), the molding had no problem in practical use (allowed [Δ], and molding had a problem in practical use (no good [x]). The grade of "good" means that the composition could be molded and produced an under-layer material (product) devoid of cracks that would hinder or negatively impact the performance of the under-layer material. The grade of "no good" means that the composition when molded produced an under-layer material (product) with cracks that would not allow the under-layer material to be used in a brake pad. The grade of "allowed" means that the composition could be molded and produced an under-layer material (product) suitable for use in a brake pad, but with a few small cracks. Thus, the grade of "allowed" indicates a composition that exhibits much better moldability than the compositions graded as "no good", but not quite as good as the composition graded "good".

As shown in FIG. 3, the moldability of the first example and the moldability of the first comparative example, the second comparative example and the third comparative example are preferable (good [○]), and the moldability of the second example was allowable (allowed [Δ]).

In contrast to this, the fourth comparative example had poor moldability (no good [x]) which was in an unallowable level, meaning that could not be used in a brake pad and operate as intended.

[3. 5] Noise Generation Ratio

Noise generation ratios were evaluated such that a case in which a generation ratio of noise exceeding 70 dB was significantly lower than 6.0% was evaluated as very good (excellent [⊚]), a case in which the generation ratio was lower than 6.0% was evaluated as preferable (good [○]), and a case in which the generation ratio exceeding 6.0% was evaluated as allowed (Δ).

As shown in FIG. 3, in the first example and the second example in which the loss modulus exceeded 500 MPa, the noise generation ratios were preferable (excellent [⊚] or good [○]: noise generation ratios lower than 6.0%). In comparison, the noise generation ratios for the first, second and third comparative examples exhibit permissible or sufficient noise suppression characteristics (allowed [Δ]), but not excellent or good noise suppression characteristics.

[3. 6] Comprehensive Evaluation Results

The comprehensive evaluation results represent the cumulative evaluation for each example/comparative example that takes into account the five evaluations discussed above, namely loss modulus, compressibility of just the under-layer material, compressibility of the friction material and under-layer material together, moldability and noise generation ratio. A shown in the table of FIG. 3, the comprehensive evaluation of the first example was excellent, the comprehensive evaluation of the second example was good, and the comprehensive evaluation of all four comparative examples was no good.

As a result, the inventors here discovered that when the under-layer material contains thermosetting resin, a friction modifier, rubber, and aramid fiber, wherein the amount of rubber is 20 vol % or more, and the amount of aramid fiber is more than 0 vol % and 6 vol % or less, a loss modulus in a bending vibration mode which can suppress noise can be obtained. Preferably, the under-layer material is comprised of rubber in an amount 20 vol %-40 vol %.

The inventors also discovered that when the under-layer material contains iron fiber and mineral fiber, and the total added amount of iron fiber and mineral fiber is 25 vol % or more, a loss modulus in a bending vibration mode which can be suppress noise can be obtained. Preferably, the amount of the iron fiber plus the amount of the mineral fiber in the under-layer material is 25 vol %-50 vol %.

As described above, according to the embodiment, an under-layer material having a high damping in a bending mode and a low compressibility in a compression direction is used to make it possible to improve noise performance.

The brake pad and the under-layer material composition described above can be applied to the floating-type disk brake described above as well as a so-called opposed-type (opposed-piston-type) brake pad or the like having a configuration in which pistons serving as pressing members are opposed to each other and the opposed pistons press one pair of brake pads against a disk rotor (frictionized material).

The detailed description above describes an embodiment of an under-layer material and brake pad representing an example of the inventive under-layer material and brake pad disclosed here. The invention is not limited, however, to the precise embodiment and variations described. Various changes, modifications and equivalents can be effected by one skilled in the art without departing from the spirit and scope of the invention as defined in the accompanying claims. It is expressly intended that all such changes, modifications and equivalents which fall within the scope of the claims are embraced by the claims.

What is claimed is:
1. A brake pad comprising:
a back plate;
an under-layer material fixed to the back plate;
a friction material fixed to the under-layer material so that the under-layer material is positioned between the back plate and the friction material;
the friction material containing copper at 0.5 wt % or less;
the under-layer material having an average loss modulus of 500 MPa or more at −50° C. to 0° C. in a bending mode.
2. The brake pad according to claim 1, wherein:
the under-layer material is comprised of a thermosetting resin, a friction modifier, rubber, and aramid fiber;
an amount of the rubber in the under-layer material is 20 vol % or more; and
an amount of the aramid fiber in the under-layer material is 6 vol % or less.
3. The brake pad according to claim 1, wherein the under-layer material contains iron fiber and mineral fiber, and a total amount of the iron fiber and the mineral fiber in the under-layer material is 25 vol % or more.
4. The brake pad according to claim 1, wherein:
the under-layer material is comprised of a thermosetting resin, a friction modifier, rubber, and aramid fiber;
an amount of the rubber in the under-layer material is 20 vol % or more; and
an amount of the aramid fiber in the under-layer material is more than 0 vol % and 6 vol % or less.
5. The brake pad according to claim 1, wherein the under-layer material is comprised of rubber in an amount 20 vol %-40 vol %.
6. The brake pad according to claim 1, wherein the under-layer material is comprised of aramid fiber in an amount 3 vol %-6 vol %.
7. The brake pad according to claim 1, wherein the under-layer material is comprised of iron fiber and mineral fiber in an amount 25 vol %-50 vol %.

8. The brake pad according to claim 7, wherein the under-layer material is comprised of rubber in an amount 20 vol %-40 vol %.

9. The brake pad according to claim 7, wherein the under-layer material is comprised of aramid fiber in an amount 3 vol %-6 vol %.

10. The brake pad according to claim 9, wherein the under-layer material is comprised of rubber in an amount 20 vol %-40 vol %.

11. An under-layer material composition used to fabricate an under-layer material configured to be fixed to a back plate and to have friction material containing copper at 0.5 wt % or less fixed to the under-layer material to form a brake pad, the under-layer material composition comprising:
    a composition of material that possesses an average loss modulus of 500 MPa or more at −50° C. to 0° C. in a bending mode.

12. A brake pad comprising:
    a back plate;
    an under-layer material fixed to the back plate;
    a friction material fixed to the under-layer material so that the under-layer material is positioned between the back plate and the friction material;
    the friction material containing copper at 0.5 wt % or less;
    the under-layer material being comprised of: i) a thermosetting resin; ii) a friction modifier; iii) rubber; and iv) aramid fiber;
    the under-layer material possessing an average loss modulus of 500 MPa or more at −50° C. to 0° C. in a bending mode.

13. The brake pad according to claim 12, wherein the under-layer material is comprised of rubber in an amount 20 vol %-40 vol %.

14. The brake pad according to claim 12, wherein the under-layer material is comprised of aramid fiber in an amount 3 vol %-6 vol %.

15. The brake pad according to claim 12, wherein the under-layer material is comprised of iron fiber and mineral fiber in an amount 25 vol %-50 vol %.

16. The brake pad according to claim 15, wherein the under-layer material is comprised of rubber in an amount 20 vol %-40 vol %.

17. The brake pad according to claim 15, wherein the under-layer material is comprised of aramid fiber in an amount 3 vol %-6 vol %.

18. The brake pad according to claim 17, wherein the under-layer material is comprised of rubber in an amount 20 vol %-40 vol %.

* * * * *